US010326576B2

(12) United States Patent
John Wilson et al.

(10) Patent No.: US 10,326,576 B2
(45) Date of Patent: Jun. 18, 2019

(54) REUSING LONG-TERM EVOLUTION (LTE) REFERENCE SIGNALS FOR NESTED SYSTEM OPERATIONS

(71) Applicant: QUALCOMM INCORPORATED, San Diego, CA (US)

(72) Inventors: Makesh Pravin John Wilson, San Diego, CA (US); Tao Luo, San Diego, CA (US); Xiao feng Wang, San Diego, CA (US); Sony Akkarakaran, Poway, CA (US); Wooseok Nam, San Diego, CA (US); Sumeeth Nagaraja, San Diego, CA (US); Kaushik Chakraborty, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/948,539

(22) Filed: Apr. 9, 2018

(65) Prior Publication Data
US 2018/0316472 A1 Nov. 1, 2018

Related U.S. Application Data

(60) Provisional application No. 62/492,064, filed on Apr. 28, 2017.

(51) Int. Cl.
*H04L 5/00* (2006.01)
*H04W 76/15* (2018.01)
(Continued)

(52) U.S. Cl.
CPC .......... *H04L 5/0048* (2013.01); *H04L 5/0035* (2013.01); *H04L 5/0053* (2013.01);
(Continued)

(58) Field of Classification Search
CPC ............................ H04L 5/0048; H04W 76/15
See application file for complete search history.

(56) References Cited

U.S. PATENT DOCUMENTS

| 7,957,352 B2 * | 6/2011 | Vanghi | H04W 36/0066 370/335 |
| 8,432,786 B2 * | 4/2013 | Li | H04L 5/0007 370/208 |

(Continued)

OTHER PUBLICATIONS

International Search Report and Written Opinion—PCT/US2018/026930—ISA/EPO—dated Jul. 13, 2018.

(Continued)

*Primary Examiner* — Parth Patel
(74) *Attorney, Agent, or Firm* — Liem T. Do

(57) ABSTRACT

Wireless communications systems and methods related to reusing long-term evolution (LTE) resources in a nested network system are provided. A first wireless communication device receives, from a second wireless communication device, a reference signal configuration of a first network of a long-term evolution (LTE) radio access technology (RAT). The first wireless communication device and the second wireless communication device are associated with a second network of another RAT. The first wireless communication device receives, from the second wireless communication device, a communication signal in the second network based on the reference signal configuration of the first network. The reference signal configuration indicates at least one of a frequency tone of a reference signal of the first network, a time period of the reference signal of the first network, or a number of antenna ports associated with the reference signal of the first network.

30 Claims, 11 Drawing Sheets

(51) Int. Cl.
*H04L 27/26* (2006.01)
*H04W 72/04* (2009.01)

(52) U.S. Cl.
CPC ......... *H04L 27/2613* (2013.01); *H04W 76/15* (2018.02); *H04J 2211/005* (2013.01); *H04W 72/0446* (2013.01); *H04W 72/0453* (2013.01)

(56) References Cited

U.S. PATENT DOCUMENTS

| | | | | |
|---|---|---|---|---|
| 8,743,809 | B2* | 6/2014 | Vashi | H04W 72/02 |
| | | | | 370/329 |
| 8,964,668 | B2* | 2/2015 | Rydnell | H04W 8/04 |
| | | | | 370/329 |
| 9,215,697 | B2* | 12/2015 | Zhang | H04L 5/0053 |
| 9,521,680 | B2* | 12/2016 | Jovicic | H04W 72/082 |
| 9,565,600 | B2* | 2/2017 | Futaki | |
| 9,742,535 | B2* | 8/2017 | Lorca Hernando | H04J 11/00 |
| 9,839,002 | B2* | 12/2017 | Jin | H04W 68/02 |
| 9,942,890 | B2* | 4/2018 | Frenne | H04L 5/001 |
| 2008/0298339 | A1* | 12/2008 | Alamouti | H04B 7/0837 |
| | | | | 370/347 |
| 2009/0196163 | A1* | 8/2009 | Du | H04L 5/0046 |
| | | | | 370/204 |
| 2011/0103301 | A1* | 5/2011 | Mueck | H04W 48/12 |
| | | | | 370/328 |
| 2012/0057456 | A1* | 3/2012 | Bogatin | H04W 28/08 |
| | | | | 370/230.1 |
| 2012/0106506 | A1* | 5/2012 | Taaghol | H04W 36/0066 |
| | | | | 370/331 |
| 2012/0108241 | A1* | 5/2012 | Wu | H04W 24/10 |
| | | | | 455/436 |
| 2012/0120789 | A1* | 5/2012 | Ramachandran | |
| | | | | H04W 36/0022 |
| | | | | 370/220 |
| 2012/0202487 | A1* | 8/2012 | Kazmi | H04W 48/10 |
| | | | | 455/432.1 |
| 2013/0072182 | A1* | 3/2013 | Jung | H04W 24/10 |
| | | | | 455/422.1 |
| 2013/0195275 | A1* | 8/2013 | Koivisto | H04L 1/0061 |
| | | | | 380/287 |
| 2013/0260741 | A1 | 10/2013 | Yamada | |
| 2014/0295847 | A1* | 10/2014 | Futaki | H04W 36/0055 |
| | | | | 455/436 |
| 2014/0301301 | A1* | 10/2014 | Cheng | H04L 5/0048 |
| | | | | 370/329 |
| 2015/0092686 | A1* | 4/2015 | Cui | H04W 36/36 |
| | | | | 370/329 |
| 2015/0237557 | A1* | 8/2015 | Alonso-Rubio | H04W 36/30 |
| | | | | 455/437 |
| 2015/0327125 | A1* | 11/2015 | Lindoff | H04W 48/18 |
| | | | | 455/437 |
| 2015/0334609 | A1* | 11/2015 | Waldhauser | H04W 36/0061 |
| | | | | 455/436 |
| 2015/0351117 | A1* | 12/2015 | Rahman | H04L 5/1469 |
| | | | | 370/252 |
| 2016/0073331 | A1* | 3/2016 | Balakrishnan | H04W 4/02 |
| | | | | 455/456.1 |
| 2016/0119824 | A1* | 4/2016 | Jin | H04W 36/0016 |
| | | | | 455/436 |
| 2016/0165431 | A1* | 6/2016 | Chandramouli | H04W 36/0022 |
| | | | | 455/435.2 |
| 2016/0165510 | A1* | 6/2016 | Jun | H04W 36/22 |
| | | | | 370/230 |
| 2016/0183261 | A1* | 6/2016 | Koorapaty | H04W 28/085 |
| | | | | 370/239 |
| 2016/0262059 | A1* | 9/2016 | Butala | H04W 36/0033 |
| 2017/0331577 | A1* | 11/2017 | Parkvall | H04J 11/0079 |
| 2018/0007729 | A1* | 1/2018 | Koshta | H04W 76/18 |
| 2018/0091267 | A1* | 3/2018 | Kim | H04L 27/2602 |
| 2018/0092085 | A1* | 3/2018 | Shaheen | H04W 28/08 |
| 2018/0279229 | A1* | 9/2018 | Dinan | H04W 52/146 |
| 2018/0287682 | A1* | 10/2018 | Kwak | H04B 7/0626 |

OTHER PUBLICATIONS

Nokia, et al., "Measurement Coordination for LTE-NR Tight Interworking," 3GPP Draft; R2-1702693 LTE-NR Measurement Framework, 3rd Generation Partnership Project (3GPP), Mobile Competence Centre; 650, Route Des Lucioles; F-06921 Sophia-Antipolis Cedex; France, vol. RAN WG2, No. Spokane, Apr. 3, 2017-Apr. 7, 2017, Apr. 3, 2017, XP051244689, 5 pages, Retrieved from the Internet: http://www.3gpp.org/ftp/Meetings_3GPP_SYNC/RAN2/Docs/ [retrieved on Apr. 3, 2017].

ZTE: "Discussion on Control Plane for the DC based LTE/NR Tight Interworking," 3GPP Draft; R2-163741 Discussion on Control Plane for the DC Based LTE NR Tight Interworking, 3rd Generation Partnership Project (3GPP), Mobile Competence Centre; 650, Route Des Lucioles; F-06921 So, vol. RAN WG2, No. Nanjing, China, May 23, 2016-May 27, 2016, May 13, 2016, XP051095713, 7 pages, Retrieved from the Internet: URL: http://www.3gpp.org/ftp/tsg_ran/WG2_RL2/TSGR2_94/Docs/ [retrieved on May 13, 2016].

* cited by examiner

REUSING LONG-TERM EVOLUTION (LTE) REFERENCE SIGNALS FOR NESTED SYSTEM OPERATIONS

CROSS REFERENCE TO RELATED APPLICATIONS

The present application claims priority to and the benefit of the U.S. Provisional Patent Application No. 62/492,064, filed Apr. 28, 2017, which is hereby incorporated by reference in its entirety as if fully set forth below and for all applicable purposes.

TECHNICAL FIELD

This application relates to wireless communication systems, and more particularly to reusing long-term evolution (LTE) resources for a radio access network (RAN) of another radio access technology (RAT) in a nested network system. Embodiments of the present application enable inter-RAT quasi-co-location (QCL).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded connectivity, wireless communication technologies or RATs are advancing from the LTE technology to a next generation new radio (NR) technology. For example, NR may provide lower latency and a higher bandwidth or throughput then LTE. One approach to providing the improved NR functionalities is to deploy an NR network within an LTE network. In other words, the NR network may be overlaid on top of the LTE network with overlapping coverage areas, where the NR network and the LTE network may operate over overlapping spectrums. Accordingly, co-existence and efficient resource utilization between LTE and NR may be important.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes receiving, by a first wireless communication device from a second wireless communication device, a reference signal configuration of a first network of a long-term evolution (LTE) radio access technology (RAT), wherein the first wireless communication device and the second wireless communication device are associated with a second network of another RAT; and receiving, by the first wireless communication device from the second wireless communication device, a communication signal in the second network based on the reference signal configuration of the first network.

In an additional aspect of the disclosure, a method of wireless communication, includes obtaining, by a first wireless communication device from a second wireless communication device, a reference signal configuration of a first network of a long-term evolution (LTE) radio access technology (RAT), wherein the second wireless communication device is associated with the first network, and wherein the first wireless communication device is associated with a second network of another RAT; transmitting, by the first wireless communication device to a third wireless communication device in the second network, the reference signal configuration of the first network; and transmitting, by the first wireless communication device to the third wireless communication device, a communication signal in the second network based on the reference signal configuration of the first network.

In an additional aspect of the disclosure, an apparatus includes a transceiver configured to receive, from a second wireless communication device, a reference signal configuration of a first network of a long-term evolution (LTE) radio access technology (RAT), wherein the apparatus and the second wireless communication device are associated with a second network of another RAT; and receive, from the second wireless communication device, a communication signal in the second network based on the reference signal configuration of the first network.

In an additional aspect of the disclosure, an apparatus includes a processor configured to obtain, from a second wireless communication device, a reference signal configuration of a first network of a long-term evolution (LTE) radio access technology (RAT), wherein the second wireless communication device is associated with the first network, and wherein the apparatus is associated with a second network of another RAT; and a transceiver configured to transmit, to a third wireless communication device in the second network, the reference signal configuration of the first network; and transmit, to the third wireless communication device, a communication signal in the second network based on the reference signal configuration of the first network.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
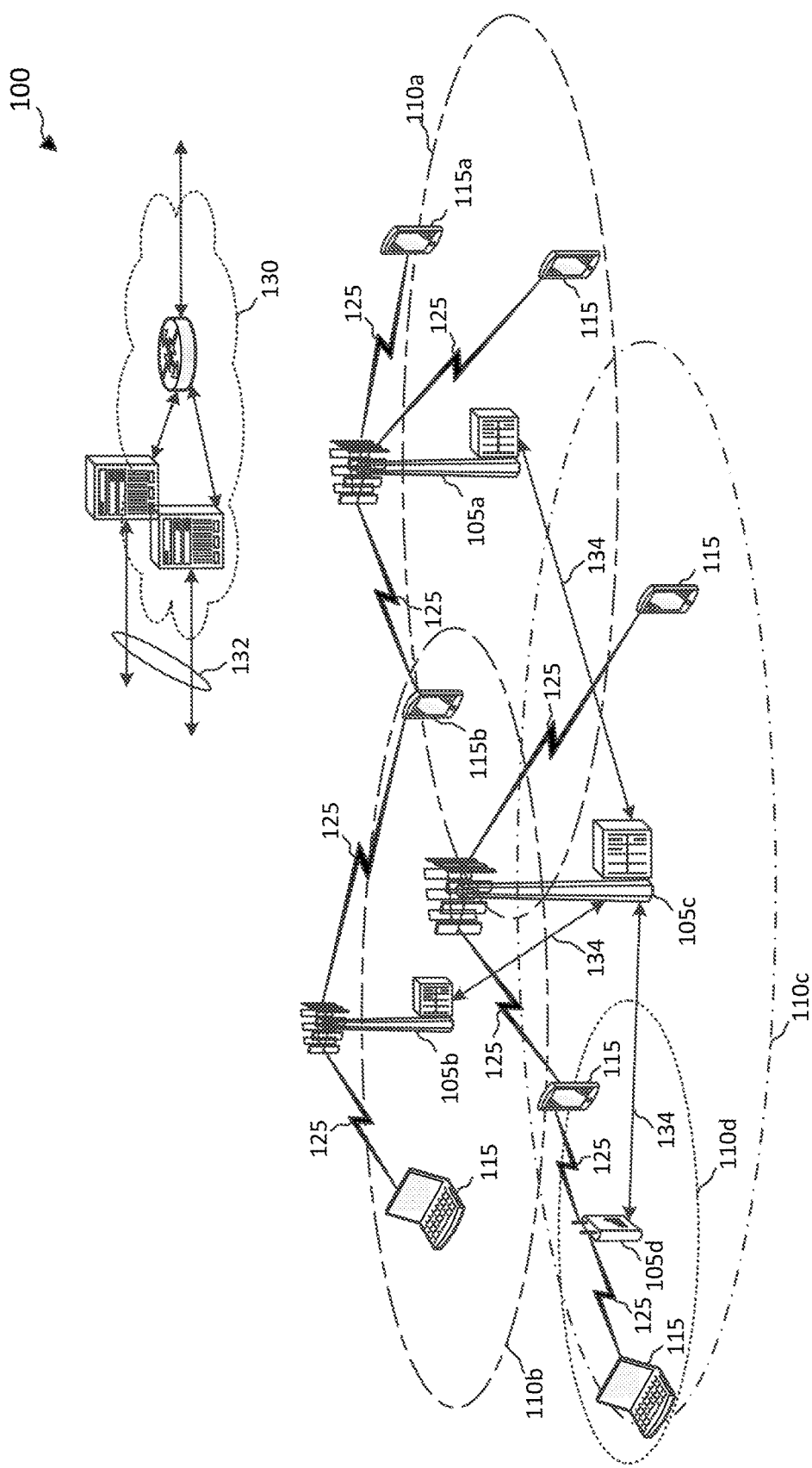
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for reusing LTE resources in a nested network system. A nested network system refers to the deployment of one RAT within another RAT. For example, a nested network system may include an NR network overlaid on top of an LTE network. In the disclosed embodiments, the NR network reuses reference signal resources of the LTE network instead of generating new NR specific reference signals. Reference signals carry predetermined sequences at predetermined time and/or frequency locations that may be used for various types of channel measurements. For example, an LTE cell-specific reference signal (CRS) can function as part of an NR CRS in the NR network and an LTE channel state information-reference signal (CSI-RS) can function as part of an NR CSI-RS in the NR network. The LTE CRSs and the LTE CSI-RSs may provide similar functionalities in the NR network as in the LTE network. For example, the LTE CRSs and/or CSI-RSs may facilitate channel quality measurement, frequency and/or timing offset tracking, and/or channel response estimation in the NR network.

In an embodiment, an NR BS may be co-located with an LTE BS. The NR BS may obtain an LTE reference signal configuration (e.g., resources) from the LTE BS and provide the LTE reference signal configuration to NR UEs in the NR network. The NR BS may schedule data transmissions with the NR UEs based on the LTE reference signal configuration. The NR BS may indicate that the NR reference signal ports are quasi-co-located (QCL) with LTE reference signal ports. For example, the NR BS may configure a transmission grant in a time period including an LTE reference signal transmission and map data tones to frequency tones that are non-overlapping with the LTE reference signal transmission. Thus, an NR UE may receive the LTE reference signal configuration from the NR BS and may receive a scheduled or granted transmission from the NR BS based on the mapping of the data tones to the frequency tones that are non-overlapping with the LTE reference signal transmission. In other words, the NR BS and the NR UE may rate match around LTE reference signals for DL communication signals. The NR UEs may receive LTE reference signals from the LTE BS. The NR UEs may receive NR data signals from the NR BS. The NR UEs may perform channel measurements based on the LTE reference signals and decode NR data from the NR data signals based on the channel measurements. The disclosed embodiments may be applied to NR networks configured with the same numerology (e.g., subcarrier or frequency tone spacing) as the LTE network or a different numerology than the LTE network.

Aspects of the present application can provide several benefits. For example, the reuse of the LTE reference signal resources can provide an efficient NR network design without utilizing additional NR specific reference signal resources. In addition, the scheduling of the NR data transmissions based on the LTE reference signal configuration can avoid interfering with legacy LTE operations and can allow the LTE reference signals to function as NR demodulation reference signals (DMRSs). The disclosed embodiments allow NR networks to co-exist with LTE networks without interfering with legacy LTE operations. The disclosed embodiments enable quasi-co-location (QCL) across RATs. For example, LTE reference signals are QCL with reference signals in NR. In some instances, LTE cell-specific reference signal (CRS) and/or LTE channel state information-reference signal (CSI-RS) are QCL with physical downlink shared channel (PDSCH) DMRS in NR, where PDSCH is for carrying downlink data.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into min-slots, as described in greater detail herein. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

In an embodiment, the network 100 may support multiple networks with different RAT technologies. For example, the network 100 may be initially deployed as an LTE network and subsequently add advanced RAT technologies such as NR to provide improved network functionalities, such as lower latency, greater bandwidth, and/or higher throughput. Mechanisms for deploying an NR network within an LTE network are described in greater detailer herein.

Figure 2:
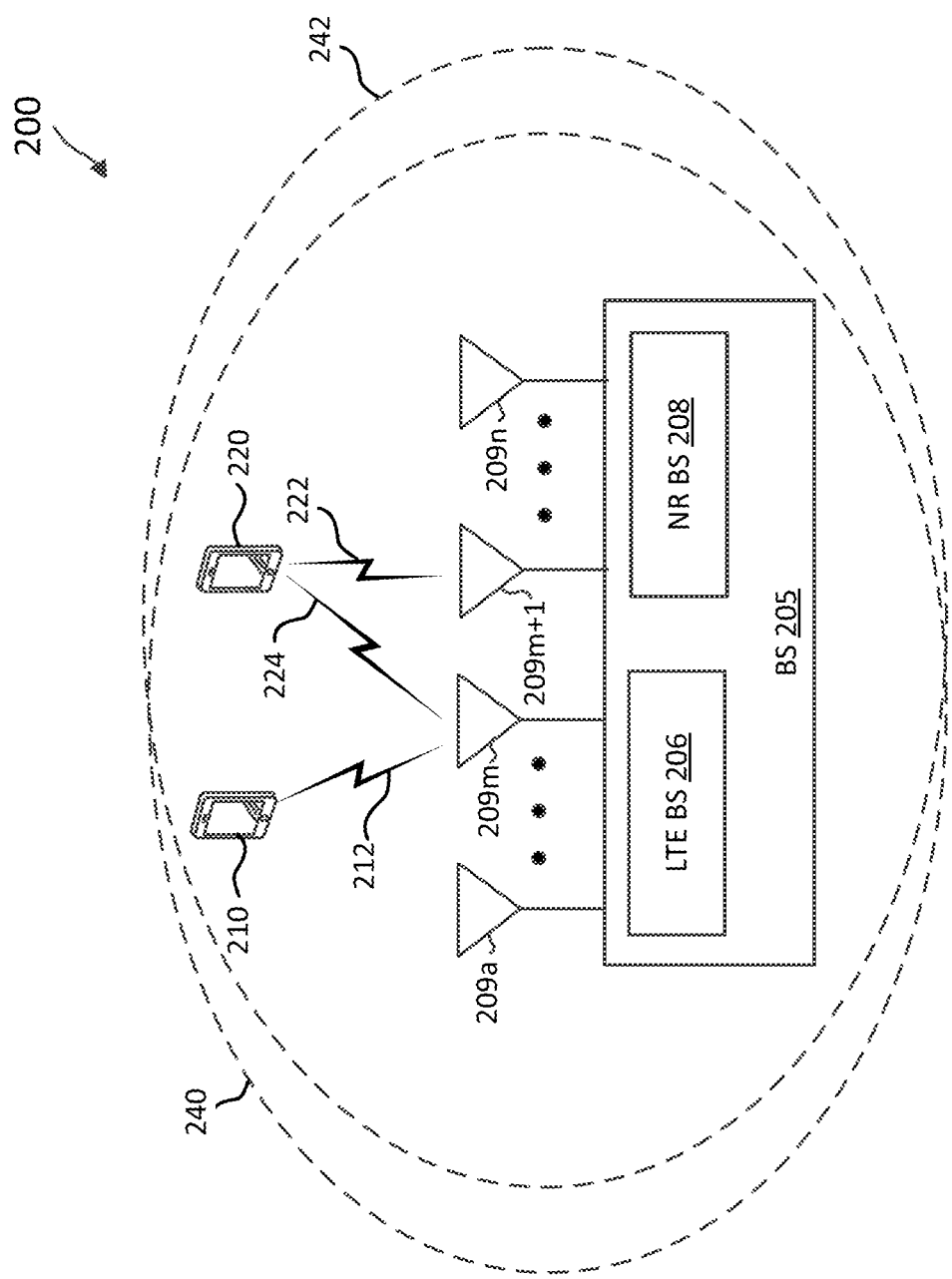
FIG. 2 illustrates a nested network system according to embodiments of the present disclosure.

FIG. 2 illustrates a nested network system 200 according to embodiments of the present disclosure. The system 200 may correspond to a portion of the network 100. The system 200 may include an NR network overlaid over an LTE network. FIG. 2 illustrates one BS 205 and two UEs 210 and 220 for purposes of simplicity of discussion, though it will be recognized that embodiments of the present disclosure may scale to many more UEs 210 and 220 and/or BSs 205. The BS 205 is substantially similar to the BS 105. However, the BS 205 may include an LTE BS 206 and an NR BS 208. The LTE BS 206 and the NR BS 208 may be co-located within the BS 205 as shown. The LTE BS 206 may operate in an LTE network 240. The NR BS 208 may operate in an NR network 242. The LTE network 240 and the NR network 242 may operate in overlapping coverage areas as shown or at least some overlapping regions. The LTE BS 206 and the NR BS 208 may operate over the same spectrum or at least overlapping spectrums. For example, the LTE BS 206 may operate over an LTE frequency band, which may have a bandwidth of about 5 MHz, about 10 MHz, or about 20 MHz, and the NR BS 208 may operate over an NR frequency band with a greater bandwidth including the LTE frequency band.

In an embodiment, the LTE BS 206 and the NR BS 208 may be software components or software stacks executing on hardware of the BS 205. The BS 205 may include a number of antennas 209 (shown as 209a . . . 209n) mapped to logical antenna ports of the LTE BS 206 and the NR BS 208. In some other embodiments, the LTE BS 206 may include hardware components specific for LTE operations and the NR BS 208 may include hardware components specific for NR operations.

As an example, the LTE BS 206 communicates with the UE 210 over a radio link 212 in the LTE network 240 based on an LTE RAN protocol. The NR BS 208 communicates with the UE 220 over a radio link 222 in the NR network 242 based on an NR RAN protocol. The UEs 210 and 220 may be substantially similar to the UEs 115. However, the UE 210 may implement LTE functionalities and the UE 220 may implement NR functionalities. Thus, the UE 210 may be referred to as an LTE UE and the UE 220 may be referred to as an NR UE.

In an embodiment, the LTE BS 206 may transmit CRSs and CSI-RSs at some periods. The CRS may include a predetermined sequence transmitted on predetermined sparsely spaced frequency tones. The CSI-RS may be substantially similar to the CRS, but may support higher-spatial layer multiplexing. The LTE UE 210 may measure the quality of the channel over the radio link 212 based on the LTE CRSs and/or CSI-RSs. The LTE UE 210 may generate channel quality indicator (CQI) reports based on the measurements and report the CQIs to the LTE BS 206. In addition, the LTE UE 210 may estimate the DL channel response of the channel based on the received CRSs and/or CSI-RSs for frequency offset and/or timing offset tracking.

To improve resource utilization efficiency, the NR BS 208 may coordinate with the LTE BS 206 to reuse LTE resources for operations in the NR network 242. For example, the NR BS 208 may synchronize timing with the LTE BS 206. In an embodiment, the NR network 242 may reuse reference signals of the LTE network 240 for NR network 242 operations instead of generating new reference signals. The NR BS 208 may configure the NR UE 220 to receive reference signals, such as the CRSs and the CSI-RSs, from the LTE BS 206. As shown, the LTE BS 206 may transmit a reference signal at the antenna 209*m*, where the reference signal may reach the LTE UE 210 and the NR UE 220 via the radio links 212 and 224, respectively. The NR UE 220 may determine the quality of the channel in the NR network 242 between the NR BS 208 and the NR UE 220 based on the LTE reference signal received from the radio link 224. The NR UE 220 may estimate a DL channel response based on the reference signal, for example, for frequency offset tracking, timing offset tracking, and/or data decoding, as described in greater detail herein.

Figure 3:
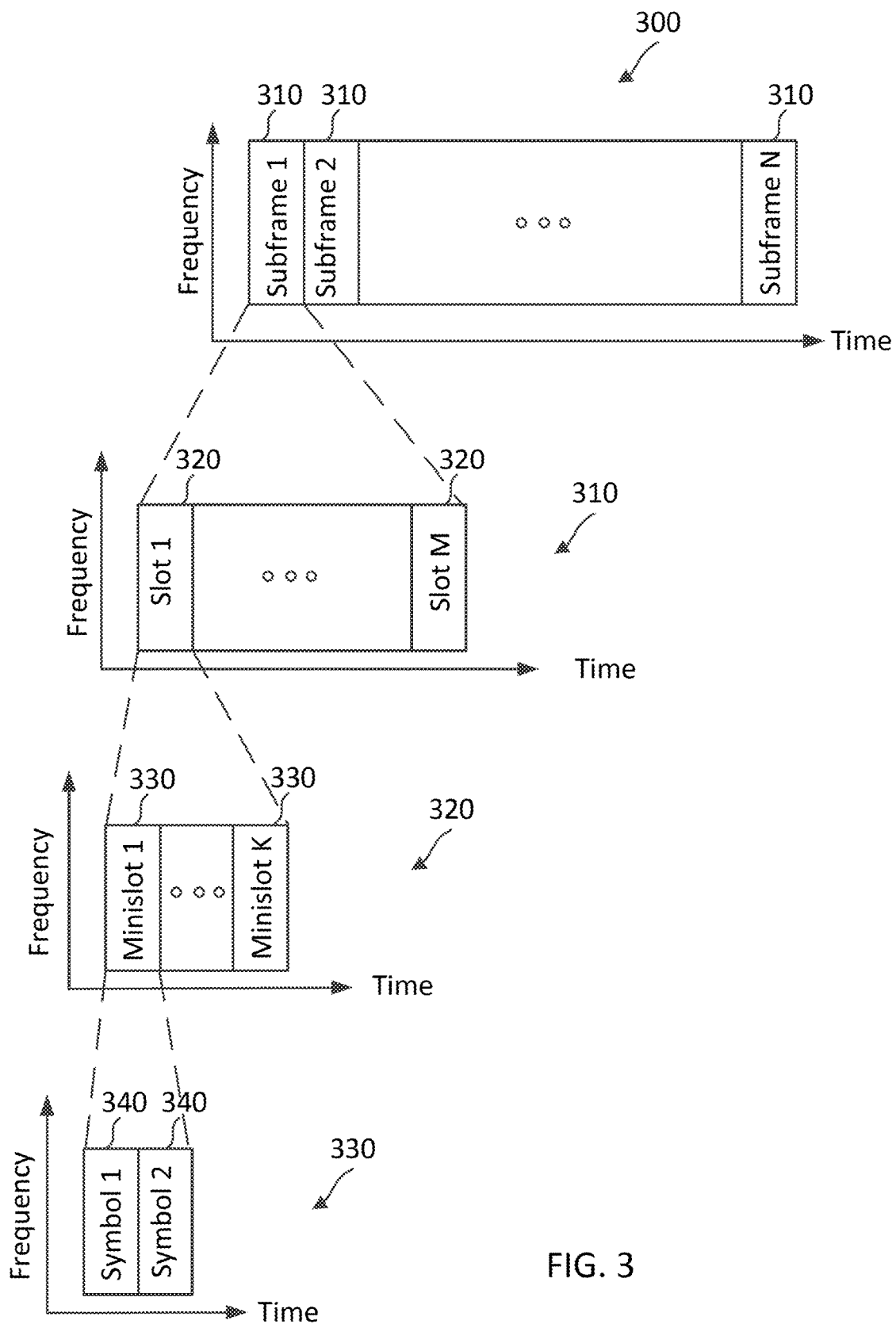
FIG. 3 illustrates a radio frame according to embodiments of the present disclosure.

FIG. 3 illustrates a radio frame 300 according to embodiments of the present disclosure. The radio frame 300 may be employed by the network 100 and the system 200. In particular, BSs such as the BSs 105, 205, 206, and 208 and UEs such as the UEs 115, 210, and 220 may exchange data using the radio frame 300. In FIG. 3, the x-axes represent time in some constant units and the y-axes represent frequency in some constant units. The radio frame 300 includes N plurality of subframes 310 spanning in time and frequency. In an embodiment, a radio frame 300 may span a time interval of about 10 milliseconds (ms). Each subframe 310 includes M plurality of slots 320. Each slot 320 includes K plurality of mini-slots 330. Each mini-slot 330 may include one or more symbols 340. N, M, and K may be any suitable positive integers. The BSs or the UEs may send data in units of subframes 310, slots 320, or mini-slots 330. In some embodiments, the slots 320 may not be aligned to the mini-slots 330 as shown. For example, a subframe 310 may include a number of mini-slots 330 with a variable number of symbols 340.

In an embodiment, an LTE BS such as the LTE BS 206 may be configured to communicate with an LTE UE such as the LTE UE 210 in units of slots 320, while an NR BS such as the NR BS 208 may be configured to communicate with an NR UE such as the NR UE 220 in units of mini-slots 330, as described in greater detail herein.

Figure 4:
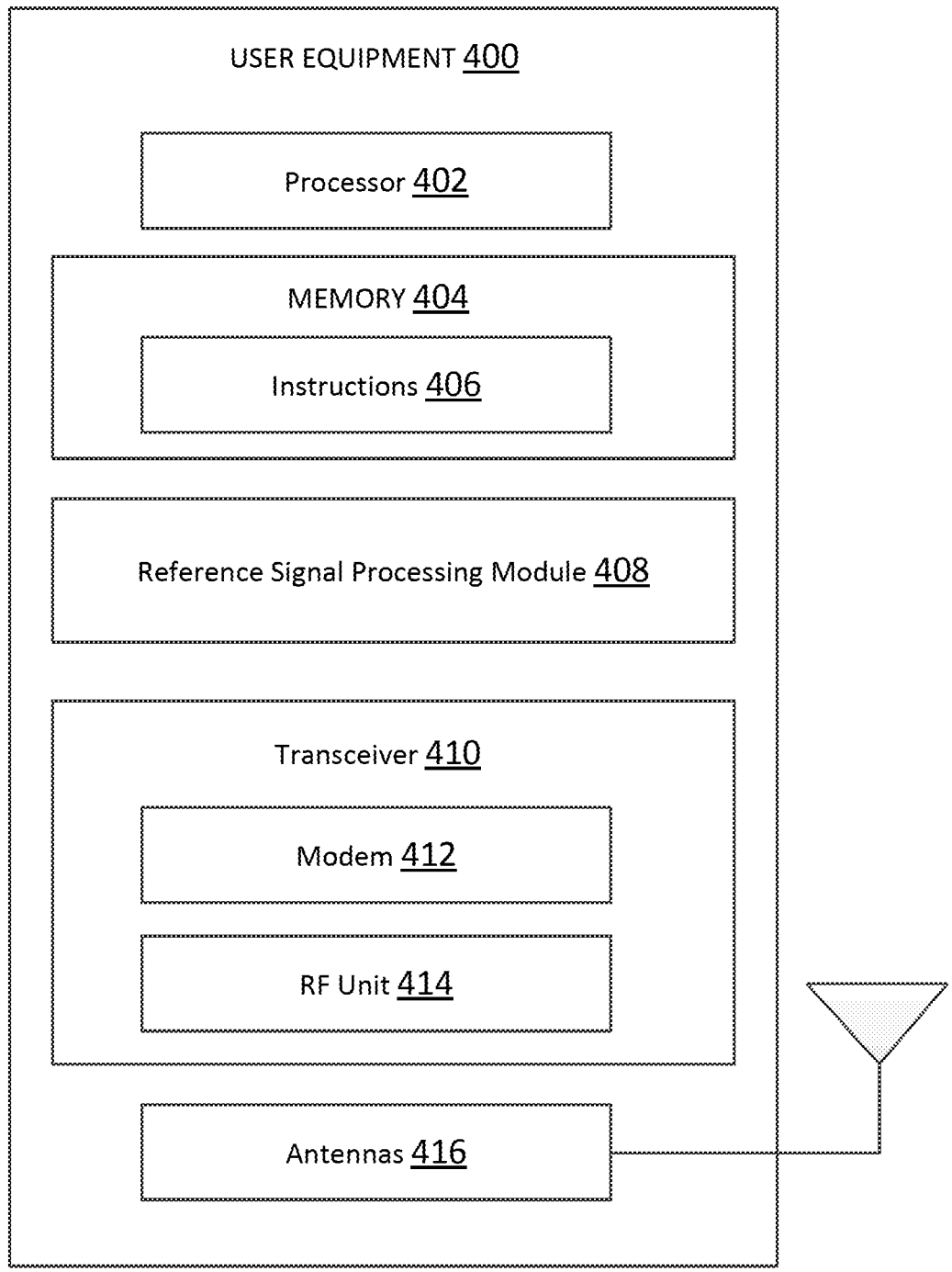
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115, 210, or 220 as discussed above. As shown, the UE 400 may include a processor 402, a memory 404, a reference signal processing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 220 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The reference signal processing module 408 may be used for various aspects of the present disclosure. For example, the reference signal processing module 408 is configured to receive reference signals from an LTE network, determine channel quality based on the received reference signals, perform frequency offset tracking based on the received reference signals, perform timing offset tracking based on the received reference signals, and/or estimate channel responses based on the received reference signals, as described in greater detail herein. In an embodiment, the UE 400 may be an NR UE similar to the NR UE 220 and the reference signal processing module 408 may be configured to receive LTE reference signals from an LTE network and perform NR network operations based on the LTE reference signals, as described in greater detail herein.

As shown, the transceiver 410 may include the modem subsystem 412 and the RF unit 414. The transceiver 410 can be configured to communicate bi-directionally with other devices, such as the BSs 105, 206, and 208. The modem subsystem 412 may be configured to modulate and/or encode the data from the memory 404 and/or the reference signal processing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of CQI reports and/or SRSs according to embodiments of the present disclosure. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
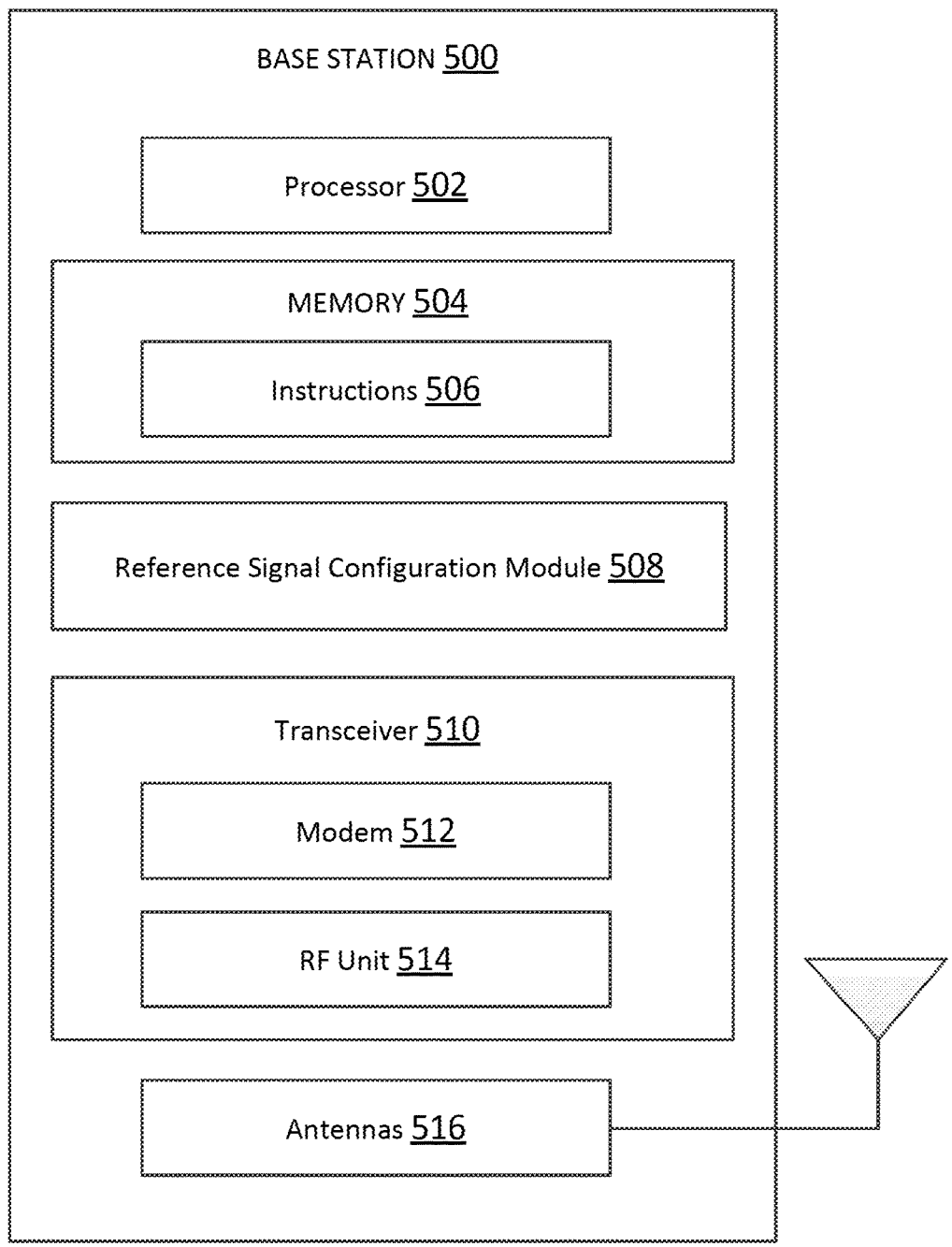
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105, 205, 206, or 208 as discussed above. A shown, the BS 500 may include a processor 502, a memory 504, a reference signal configuration module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The reference signal configuration module 508 may be used for various aspects of the present disclosure. For example, the reference signal configuration module 508 is configured to configure reference signal transmission resources, such as frequency tone locations and/or symbol periods. In an embodiment, the BS 500 may be an NR BS similar to the NR BS 208 and the reference signal configuration module 508 may be configured to coordinate with an LTE BS such as the LTE BS 206 to obtain LTE reference signal transmission configurations, configure transmission periods (e.g., the mini-slots 330) based on the LTE reference signal transmission configurations, transmit data signals based on the transmission periods and the LTE reference signal transmission configurations, as described in greater detail herein.

As shown, the transceiver 510 may include the modem subsystem 512 and the RF unit 514. The transceiver 510 can be configured to communicate bi-directionally with other devices, such as the UEs 115 and 220 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 (e.g., the antennas 209) for transmission to one or more other devices. This may include, for example, transmission of information to complete attachment to a network and communication with a camped UE 115 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
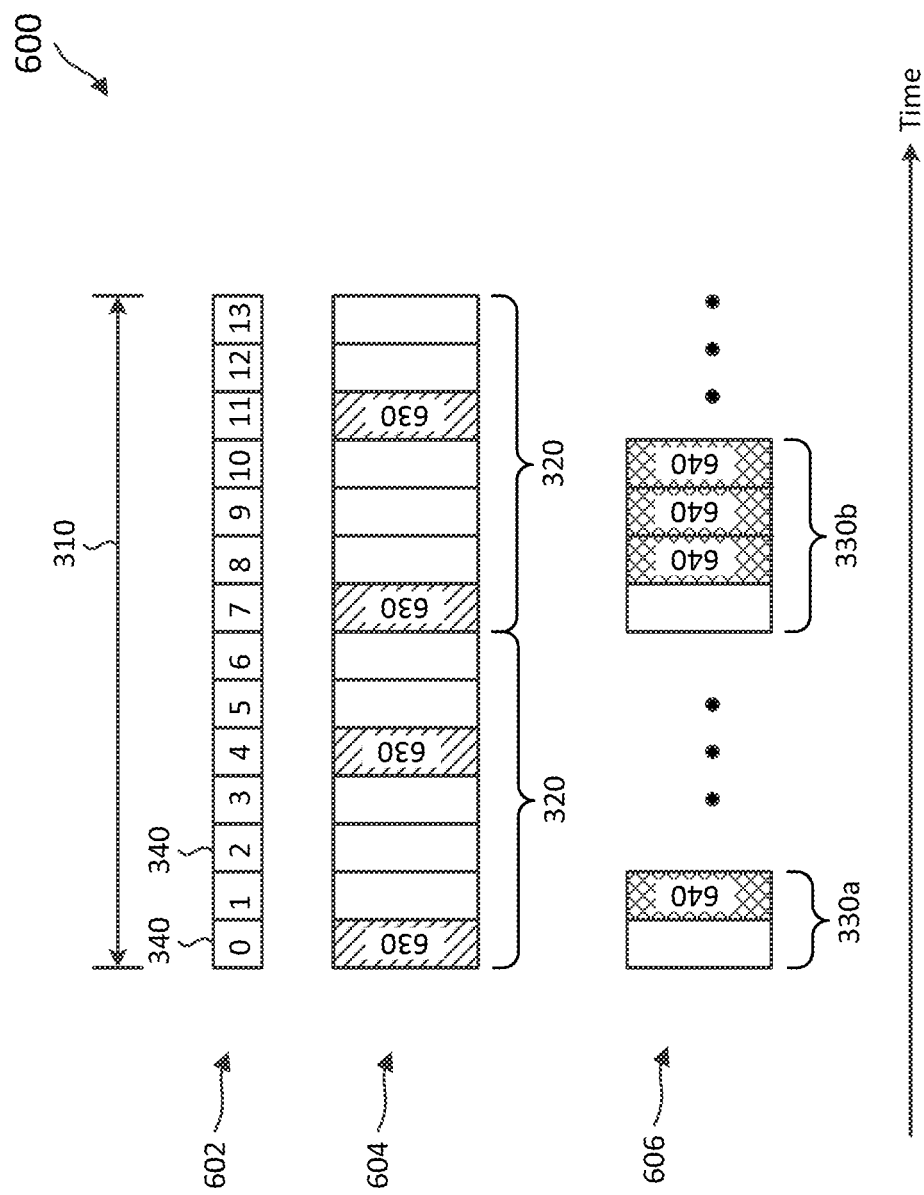
FIG. 6 illustrates a long-term evolution (LTE) resource reuse scheme according to embodiments of the present disclosure.

FIG. 6 illustrates an LTE resource reuse scheme 600 according to embodiments of the present disclosure. In FIG. 6, the x-axis represents time in some constant units. The scheme 600 is employed by a nested network system (e.g., the system 200) including an LTE network (e.g., the LTE network 240) and an NR network (e.g., the NR network 242). FIG. 6 illustrates an LTE subframe structure 602, an LTE slot structure 604, and an NR mini-slot structure 606. The communications in the LTE network are based on the LTE subframe structure 602 and the LTE slot structure 604. The communications in the NR network are based on the NR mini-slot structure 606, which may be aligned to the LTE subframe structure 602. While the LTE subframe structure 602 illustrates a subframe 310 including fourteen symbols 340 indexed 0 to 13 and the LTE slot structure 604 illustrates two slots 320 within the subframe 310, the subframe 310 can include any suitable number of symbols 340 and any suitable number of slots 320.

In the scheme 600, an LTE BS such as the LTE BS 206 may periodically transmit a reference signal 630 in the LTE network. For example, the LTE BS may transmit a reference signal 630 on symbols indexed 0, 4, 7, and 11 of each subframe 310. The reference signal 630 may represent an LTE CRS or an LTE CSI-RS, for example, including a predetermined sequence. An LTE UE such as the LTE UE 210 may receive the reference signals 630 and determine channel quality, frequency and/or timing offset adjustments, and/or channel responses based on the reference signals 630. The mapping of the reference signals 630 onto frequency resources are described in greater detail herein.

The NR network may leverage the reference signal resources in the LTE network. The NR network may reuse the LTE reference signals 630 for channel measurements (e.g., timing, delay spread, and Doppler measurements), channel quality reporting, error tracking, and/or demodulation. For example, an NR BS such as the NR BS 208 co-located with the LTE BS may coordinate with the LTE BS to obtain transmission configurations (e.g., symbol locations 340 and frequency tones) of the reference signals 630.

The NR BS may configure mini-slots 330 according to the LTE subframe structure 602 and/or the LTE slot structure 604. As shown, the min-slot structure 606 includes a number of mini-slots 330 within the subframe 310. The mini-slots 330 may include a variable number of symbols 340. For example, the mini-slot 330a may include two symbols 340, while the mini-slot 330b may include four symbols 340. The NR network may configure the mini-slot 330 based on the transmission configurations of the LTE reference signals 630. For example, the mini-slots 330a can be configured to include the symbol 340 indexed 0 at which an LTE reference signal 630 is transmitted. Similarly, the mini-slot 330b can be configured to include the symbol 340 indexed 7 at which an LTE reference signal is transmitted.

The NR BS can configure NR UEs such as the NR UE 220 with the configuration (e.g., resources) of the LTE reference signals 630. The NR UEs may receive the LTE reference signals 630 according to the configuration. The NR UEs may measure the channel quality based on the received LTE reference signals 630. The NR UEs may generate and transmit CQI reports to the NR BS based on the measured channel quality. The NR UEs may perform frequency offset and/or timing offset tracking based on the received LTE reference signals 630.

When the LTE network is not transmitting data during the duration of the mini-slot 330a, the NR BS may transmit DL control information in the symbol 340 indexed 0 and/or 1 on frequency resources non-overlapping with the LTE reference signal 630, as described in greater detail herein. The DL control information may be similar to the LTE physical downlink control channel (PDCCH) information. For example, the DL control information may carry UL and/or DL transmission grants for NR UEs in the mini-slots 330. The transmission grants may indicate transmission configuration parameters, such as a modulation order, a coding rate, a transmission rank, and/or pre-coding parameters. In addition, the DL control information can indicate LTE reference signal resources, such as an LTE frequency band and/or the frequency tones or frequency pattern at which the LTE reference signals 630 are transmitted, as described in greater detail herein.

When the LTE network is not transmitting data during the duration of the mini-slot 330b, the NR BS may transmit data signals 640 in the symbols 340 indexed 8 to 10. For example, the data signals 640 may carry data destined to a target NR UE. The NR UE may receive the reference signal 630 in the symbol 340 indexed 7 and the data signals 640 in the symbols 340 indexed 8 to 10. The NR UE may estimate a DL channel response (e.g., from the NR BS to the NR UE) based on the reference signal 630. The NR UE may demodulate the data signals 640 based on the DL channel estimate and decode the data from the demodulated data signals. In some embodiments, the NR BS can additionally transmit a data signal in the symbol 340 indexed 7, but skipping the frequency tones occupied by the reference signal 630. The transmissions of the LTE reference signals 630 and the transmissions of NR data are described in greater detail herein.

Figure 7:
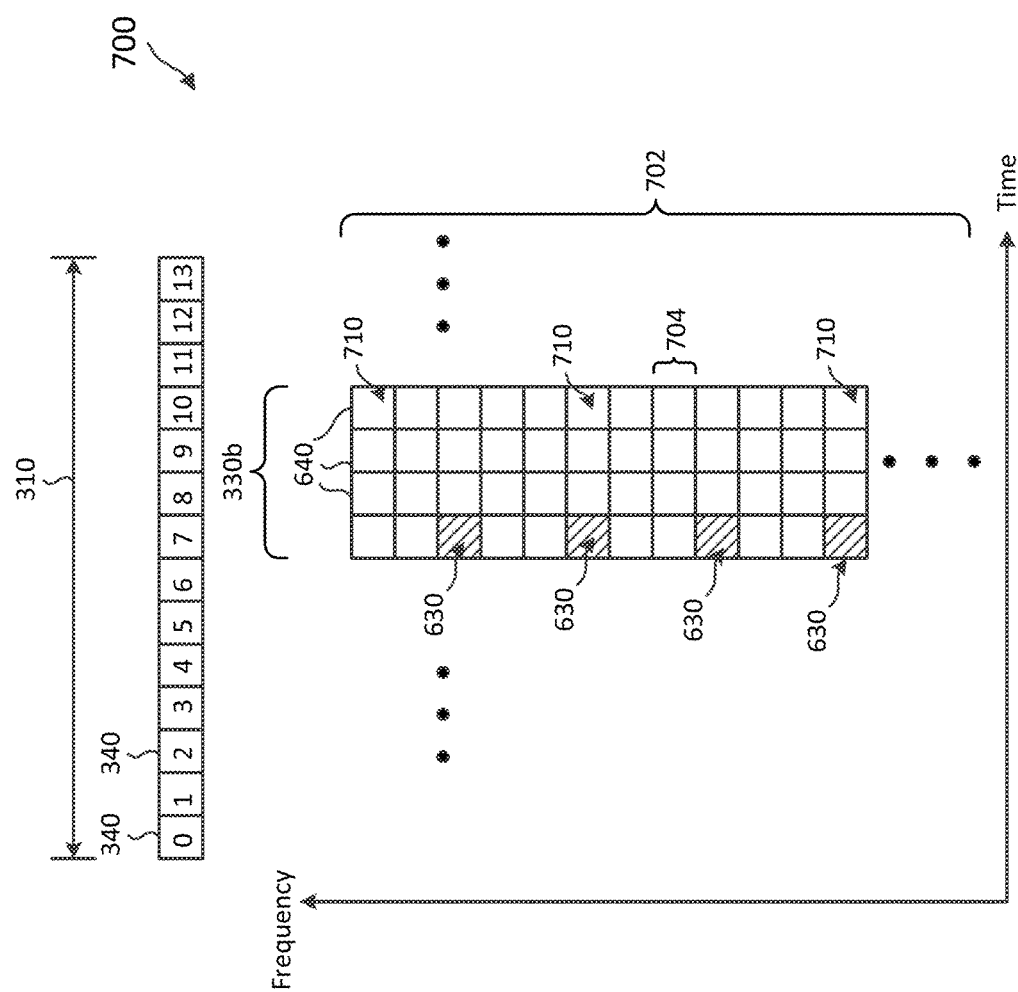
FIG. 7 illustrates a new radio (NR) transmission scheme that reuses LTE resources according to embodiments of the present disclosure.
Figure 8:
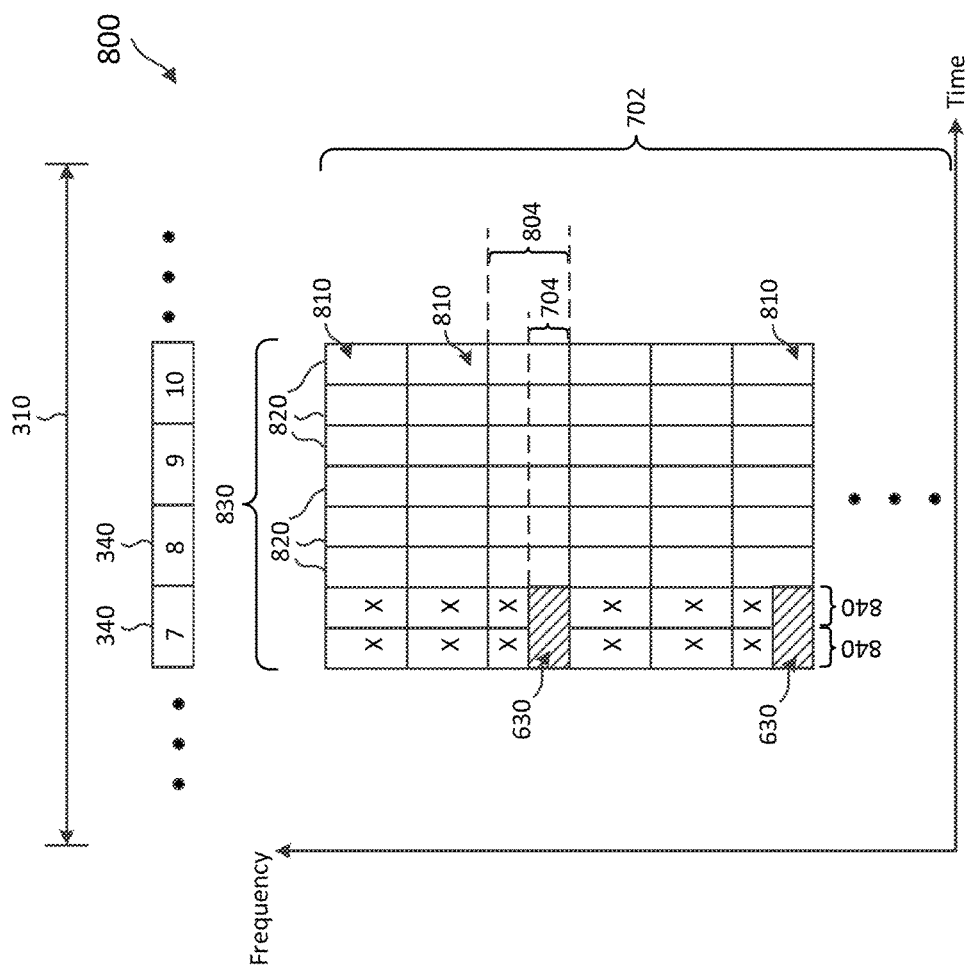
FIG. 8 illustrates an NR transmission scheme that reuses LTE resources according to embodiments of the present disclosure.

FIGS. 7 and 8 illustrate NR transmission mechanisms in a nested network system similar to the system 200 reusing LTE reference signal resources based on the scheme 600. In FIGS. 7 and 8, the x-axes represents time in some constant units and the y-axes represents frequency in some constant units.

FIG. 7 illustrates an NR transmission scheme 700 that reuses LTE resources according to embodiments of the present disclosure. The scheme 700 provides a more detailed view of the transmissions of the NR data signals 640 and the LTE reference signal 630 in the mini-slot 330b. As described above in the scheme 600, the mini-slot 330b spans in time from the symbol 340 indexed 7 to the symbol 340 indexed 10. FIG. 7 further illustrates the mini-slot 330b spanning in a frequency spectrum 702 across consecutive frequency tones 710. While FIG. 7 illustrates a portion of the mini-slot 330 including twelve frequency tones 710, the mini-slot 330 can include a greater number of frequency tones 710 or a less number of frequency tones 710. For example, both the NR network and the LTE network in the nested network system may operate over the frequency spectrum 702. In addition, the NR network may use the same numerology as the LTE network. For example, both the NR network and the LTE network may have a subcarrier or frequency tone spacing 704 of about 15 kilohertz (kHz). In some embodiments, the NR network may operate over a wider frequency band than the LTE network, including the frequency band of the LTE network. For example, the LTE frequency band may be from about 730 MHz to about 740 MHz and the NR frequency band may be from about 720 MHz to about 760 MHz.

As described in the scheme 600, the LTE reference signal 630 is transmitted in the symbol 340 indexed 7. The pattern-filled boxes shown in FIG. 7 represent the transmissions of the LTE reference signal 630 by the LTE BS. While FIG. 7 illustrates the transmission of the LTE reference signal 630 on four frequency tones 710, the LTE reference signal 630 may be transmitted on any suitable number of frequency tones 710 and any suitable frequency tone locations in the symbol 340 indexed 7. In some instances, the number of frequency tones 710 used for carrying the LTE reference signal 630 may be dependent on the number of antennas ports (e.g., LTE-CRS ports). In some embodiments, the LTE reference signal 630 may be a predetermined sequence (e.g., a pseudo random sequence) and the sequence values may be mapped onto sparsely spaced frequency tones 710. The selection of the frequency tones 710 for transmitting the LTE reference signal 630 and the selection of the sequence (e.g., a sequence root and/or a cyclic shift) may be dependent on the cell identifier of the LTE network.

The NR BS may transmit data signals 640 to the NR UE on the frequency tones 710 in the symbols 340 indexed 8, 9, and 10. In some embodiments, the NR BS may additionally transmit control information and/or data in the symbol 340 indexed 7 on the frequency tones 710 that are not occupied by the LTE reference signal 630. When the NR UE receives signals from the mini-slot 330b, the NR UE may determine the DL channel response at the frequency tones 710 that carry the LTE reference signal 630 and may apply interpolation to obtain the DL channel response across the frequency tones 710.

FIG. 8 illustrates an NR transmission scheme 800 that reuses LTE resources according to embodiments of the present disclosure. The scheme 800 is similar to the scheme 700, but illustrates NR transmissions when the NR network has a different numerology (e.g., frequency tone spacing) than the LTE network. For example, the LTE network has a frequency tone spacing 704 of about 15 kHz, whereas the NR network has a frequency tone spacing 804 of about 30 kHz. As shown, a mini-slot 830 similar to the mini-slot 330b spans in time across the LTE symbol 340 indexed 7 to 10. However, the mini-slot 830 span across consecutive frequency tones 810 in the frequency spectrum 702 with a greater frequency tone spacing 804 than the frequency tones 710. In addition, the mini-slot 830 includes two NR symbols 840 within each LTE symbol 340 since the NR frequency tone spacing 804 is double the LTE frequency tone spacing 704.

While the NR network has a different numerology than the LTE network, the LTE network operations may not be affected or aware of the different numerologies. The LTE BS may continue to transmit the LTE reference signal 630 at the same frequency tones 710 as in the scheme 700. However, the NR UE may receive the LTE reference signal 630 across two symbols 840 as shown. The NR UE may estimate DL channels based on the LTE reference signal 630 at the frequencies (e.g., a portion of a frequency tone 810) where the LTE reference signal 630 is transmitted. The NR UE may apply interpolation to obtain the DL channel across the frequency tones 810. The NR BS may transmit data signals 820 in the NR symbols 840 corresponding to the LTE symbols 340 indexed 8, 9, and 10. In some embodiments, the NR BS may not transmit data signals in the first two NR symbols 840 at the beginning of the mini-slot 330b corresponding to the LTE symbol 340 indexed 7 where the LTE reference signal 630 is transmitted due to the different numerologies. The symbol "X" shown in FIG. 8 represents no signal transmission on the frequency tones 810.

Figure 9:
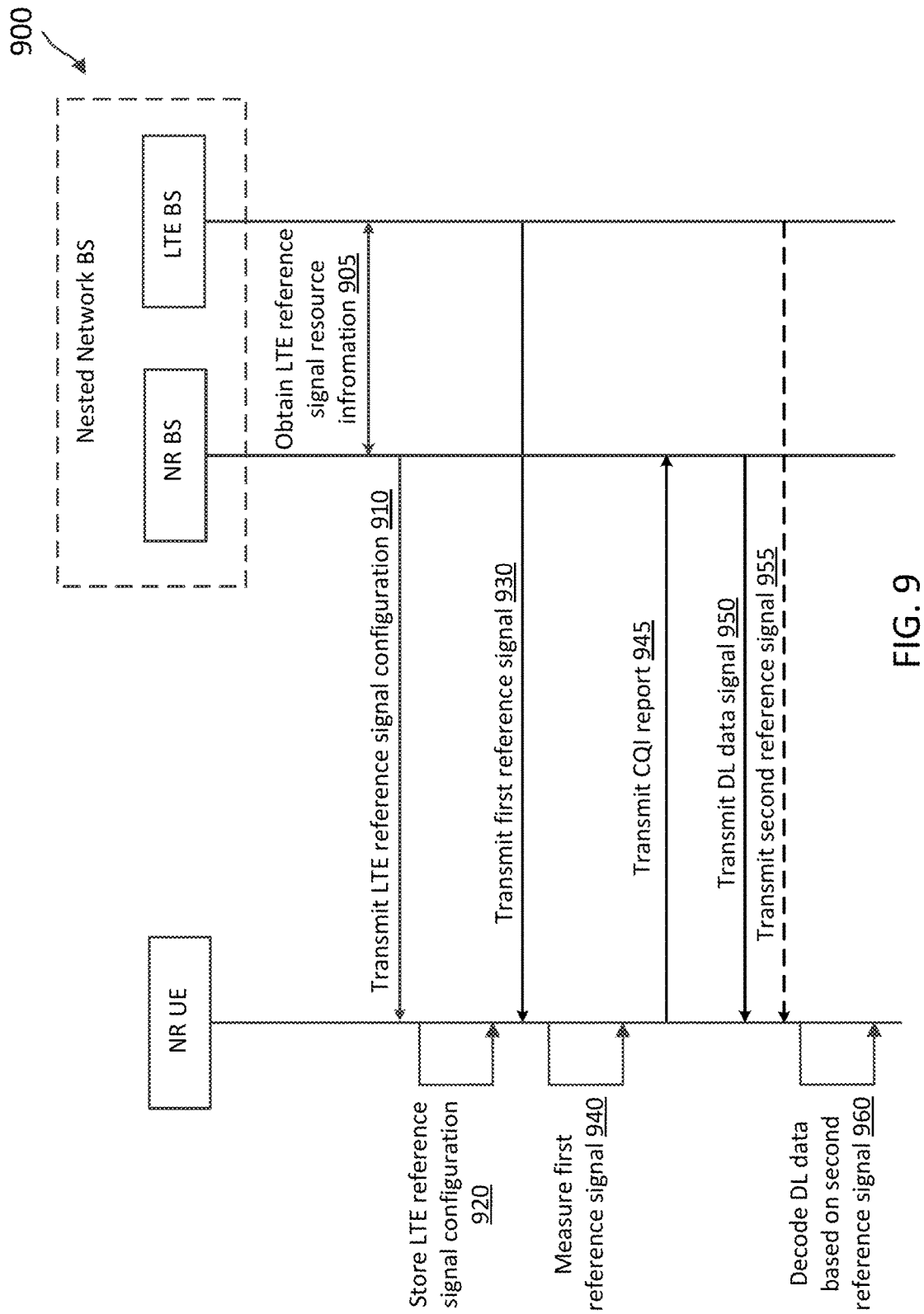
FIG. 9 is a signaling diagram of a method of reusing LTE resource in a nested network system according to embodiments of the present disclosure.

FIG. 9 is a signaling diagram of a method 900 of reusing LTE resource in a nested network system such as the system 200 according to embodiments of the present disclosure. Steps of the method 900 can be executed by computing devices (e.g., a processor, processing circuit, and/or other suitable component) of wireless communication devices, such as the BSs 206, 208, and 500 and the UEs 220 and 400. The method 900 can be better understood with reference to FIGS. 6, 7, and 8. As illustrated, the method 900 includes a number of enumerated steps, but embodiments of the method 900 may include additional steps before, after, and in between the enumerated steps. In some embodiments, one or more of the enumerated steps may be omitted or performed in a different order. The method 900 illustrates one NR UE and a nested network BS including one NR BS and one LTE BS for purposes of simplicity of discussion, though it will be recognized that embodiments of the present disclosure may scale to many more UEs and/or BSs. For example, the LTE BS, the NR BS, and the NR UE may represent the LTE BS 206, the NR BS 208, and the NR UE 220, respectively, in the system 200. The LTE BS may operate in an LTE network similar to the LTE network 240. The NR BS may operate in an NR network similar to the NR network 242 overlaid on the LTE network. The NR UE may communicate with the NR BS in the NR network, but receive reference signals (e.g., the LTE reference signals 630) from the LTE BS.

At step 905, the NR BS coordinates with the LTE BS to obtain LTE reference signal resource information. The LTE reference signal resource information may include resource mapping information such as a frequency pattern, locations of frequency tones (e.g., the frequency tones 710 and 810), and/or locations of symbols (e.g., the symbols 340 and 840) where LTE reference signals (e.g., the LTE reference signals 630) are transmitted by the LTE BS. In some instances, the time periods or symbol locations may be associated with a multicast-broadcast single-frequency network (MBSFN) configuration. In addition, the LTE reference signal resource information may include sequence information such as a sequence root and/or a cyclic shift used by LTE reference signals. In some instances, the number of frequency tones used for carrying the LTE reference signals may be dependent on the number of antennas ports (e.g., CRS ports) used for transmitting the LTE reference signals. Thus, the LTE reference signal resource information may also indicate the number of antenna ports. Alternatively, the LTE reference signal resource information may indicate parameters, such as a cell identifier of the LTE network of the LTE BS, where the frequency pattern or tone mapping of the LTE reference signals may be determined based on the parameters.

At step 910, the NR BS transmits the LTE reference signal configuration to the NR UE indicating the LTE reference signal resource information. The NR BS may transmit the LTE reference signal configuration in the NR network via a radio resource configuration (RRC) message, a media access control (MAC) control element (CE), and/or downlink control information (DCI). For example, the RRC message and the MAC CE may be carried in a data signal (e.g., the data signals 640 and 820) and the DCI may be carried in a control signal (e.g., a PDCCH signal). At step 920, the NR UE may store the LTE reference signal configuration, for example, in a memory device such as the memory 404.

At step 930, the LTE BS may transmit a first reference signal (e.g., the reference signal 630) according to the LTE reference signal configuration. For example, the first reference signal may be an LTE CRS or an LTE CSI-RS. The LTE CRS may function as an NR CRS in the NR network. The LTE CSI-RS may function as an NR CSI-RS in the NR network. In addition, the LTE CSR and/or the LTE CSI-RS may function as tracking reference signals in the NR network. In an embodiment, the NR BS may configure the NR UE to use the first reference signal as an NR CRS, an NR CSI-RS, or an NR tracking RS in the LTE reference signal configuration.

At step 940, the NR UE may receive the first reference signals based on the LTE reference signal configuration. The NR UE may determine channel measurements for the first reference signal. Since the NR BS is co-located with the LTE BS, the NR UE may determine a channel quality of the channel between the NR BS and the NR UE based on the first reference signal. In addition, the NR UE may perform frequency offset tracking and/or timing offset tracking to correct a frequency error and/or a timing error based on the first reference signal. A frequency error refers to the frequency difference between the carrier frequency of the NR BS and the NR UE. A timing error refers to the timing difference between the clock or crystals of the NR BS and the NR UE. At step 945, the NR UE may transmit a CQI report to the NR BS indicating the measured channel quality.

At step 950, the NR BS may transmit DL data signals (e.g., the DL data signals 640 and 820) to the NR UE. At step 955, the LTE BS may transmit a second reference signal (e.g., the reference signals 630) to the NR UE. For example, the DL data signals and the second reference signal are transmitted on non-overlapping frequency tones (e.g., the frequency tones 710 and 810) as shown in the schemes 600, 700, and 800. The second reference signal can function as a demodulation reference signal (DMRS) for the NR transmission. In an embodiment, the NR BS may configure the NR UE to use the second reference signal a DMRS.

At step 960, upon receiving the DL data signals and the second reference signal, the NR UE may decode DL data from the DL data signal based on the second reference signal. For example, the NR UE may determine a DL channel estimate based on the second reference signal. The NR UE may demodulate the DL data signals based on the DL channel estimate and decode the DL data from the demodulated signal. In some instances, when the first reference signal and the DL data signal are received during the same time period, the NR UE may rate match around the first reference signal based on the resource mapping information (e.g., the frequency-shift parameter $v_{shift}$) in the received configuration.

Figure 10:
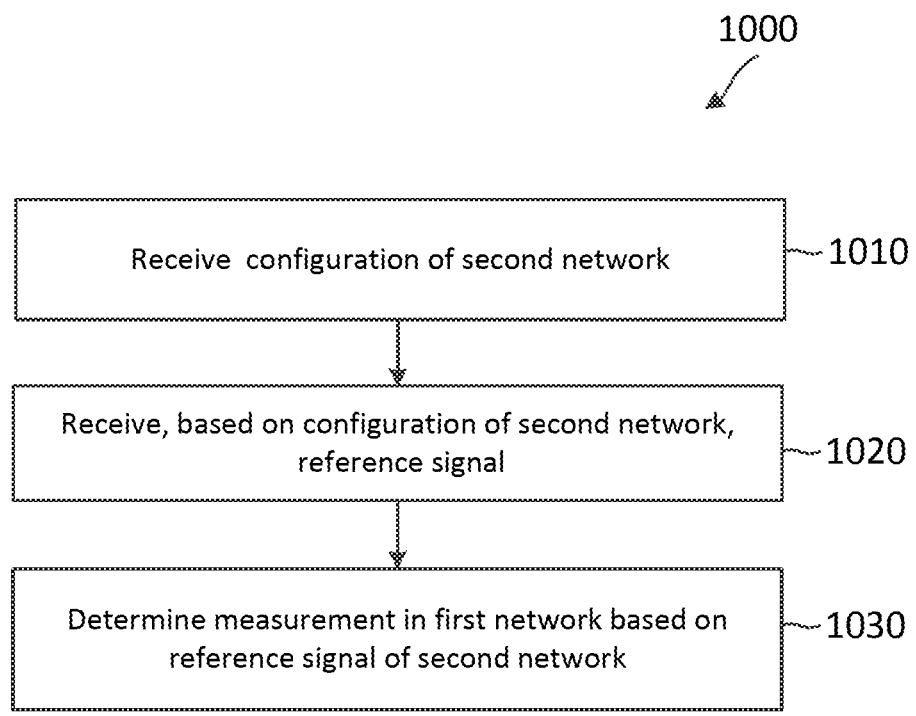
FIG. 10 is a flow diagram of a method of reusing LTE resource in a nested network system according to embodiments of the present disclosure.

FIG. 10 is a flow diagram of a method 1000 of reusing LTE resource in a nested network system such as the system 200 according to embodiments of the present disclosure. Steps of the method 1000 can be executed by a computing device (e.g., a processor, processing circuit, and/or other suitable component) of a wireless communication device, such as the UEs 115, 220, and 400. The method 1000 may employ similar mechanisms as in the schemes 600, 700, and 800 and the method 900 described with respect to FIGS. 6, 7, 8, and 9, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes receiving a configuration of a second network (e.g., the LTE network 240). For example, the configuration may is received from an NR BS (e.g., the NR BS 208). The NR BS and the wireless communication device are associated with a first network (e.g., the NR network 242). The configuration may indicate LTE reference signal resource information.

At step 1020, the method 1000 includes receiving, based on the configuration of the second network, a reference signal (e.g., the reference signals 630). For example, the reference signal is received from an LTE BS (e.g., the LTE BS 206).

At step 1030, the method 1000 includes determining a measurement in the first network based on the reference signal of the second network. For example, the measurement may be a channel quality, a frequency offset estimate, a timing offset estimate, and/or a DL channel estimate.

Figure 11:
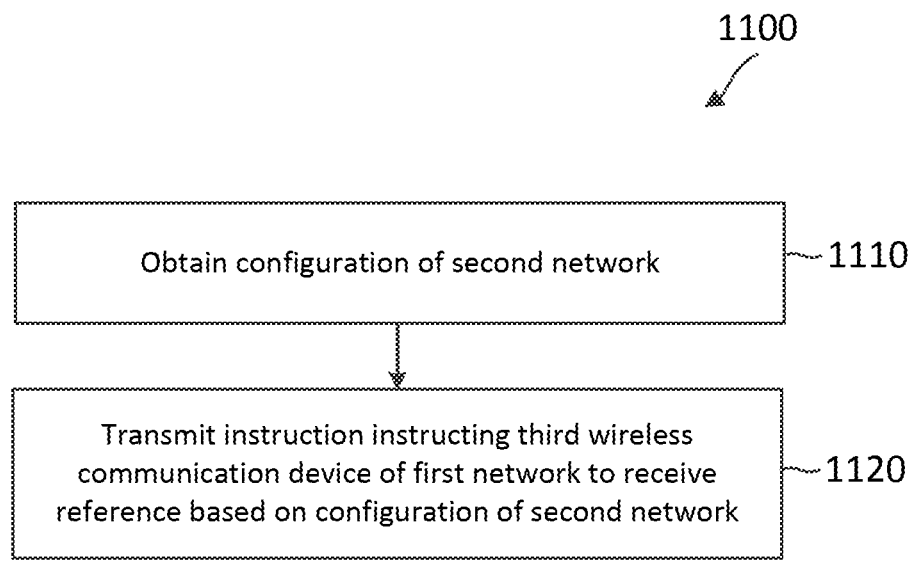
FIG. 11 is a flow diagram of a method of reusing LTE resource in a nested network system according to embodiments of the present disclosure.

FIG. 11 is a flow diagram of a method 1100 of reusing LTE resource in a nested network system such as the system 200 according to embodiments of the present disclosure. Steps of the method 1100 can be executed by a computing device (e.g., a processor, processing circuit, and/or other suitable component) of a wireless communication device, such as the BSs 105, 205, 206, 208, and 500. The method 1100 may employ similar mechanisms as in the schemes 600, 700, and 800 and the method 900 described with respect to FIGS. 6, 7, 8, and 9, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes obtaining a configuration of a second network (e.g., the LTE network 240). For example, the wireless communication device represents an NR BS (e.g., the NR BS 208) operating in a first network (e.g., the NR network 242) and the configuration of the second network may be obtained from an LTE BS (e.g., the LTE BS 206) co-located with the NR BS. The configuration may indicate LTE reference signal resource information.

At step 1120, the method 1100 includes transmitting an instruction instructing a third wireless communication (e.g., the NR UE 220) of the first network to receive a reference signal (e.g., the LTE reference signals 630) based on the configuration of the second network.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising receiving, by a first wireless communication device from a second wireless communication device, a configuration of a second network, wherein the first wireless communication device and the second wireless communication device are associated with a first network, and wherein the first network and the second network are different; receiving, by the first wireless communication device from a third wireless communication device based on the configuration of the second network, a reference signal, wherein the third wireless communication device is associated with the second network; and determining, by the first wireless communication device, a measurement in the first network based on the reference signal of the second network.

The method further includes wherein the configuration indicates at least one of a frequency tone of the reference signal, a reference signal sequence of the reference signal, or a cell identifier of the second network. The method further includes wherein configuration indicates a numerology of the second network that is different from a numerology of the first network. The method further includes transmitting, by the first wireless communication device to the second wireless communication device, the determined measurement. The method further includes wherein the determining includes determining a channel quality of a channel between the first wireless communication device and the second wireless communication device based on the reference signal. The method further includes wherein the determining includes determining a channel quality of a spatial layer between the first wireless communication device and the second wireless communication device based on the reference signal. The method further includes performing, by the first wireless communication device, error tracking based on the determined measurement, wherein the error tracking includes at least one of a frequency offset tracking or a timing offset tracking. The method further includes receiving, by the first wireless communication device from the second wireless communication device a data signal; and demodulating, by the first wireless communication device, the data signal based on the determined measurement. The method further includes wherein the configuration indicates at least a first frequency tone and a time period for a reference signal transmission by the second network, wherein the receiving the reference signal includes receiving the reference signal on at least the first frequency tone during the time period, wherein the receiving the data signal includes receiving the data signal from at least a second frequency tone during the time period, and wherein the first frequency tone and the second frequency tone are different. The method further includes wherein the configuration indicates a time period for a reference signal transmission by the second network, wherein the receiving the reference signal includes receiving the reference signal during the time period, and wherein the receiving the data signal includes receiving the data signal during another time period. The method further includes wherein the second network is a long-term evolution (LTE) network. The method further includes wherein the third wireless communication device is a LTE base station (BS), and wherein the second wireless communication device and the third wireless communication device are co-located.

Embodiments of the present disclosure include a method of wireless communication, comprising obtaining, by a first wireless communication device from a second wireless communication device, a configuration of a second network, wherein the first wireless communication device is associated with a first network, wherein the second wireless communication device is associated with the second network, and wherein the first network and the second network are different; and transmitting, by the first wireless communication device, an instruction instructing a third wireless communication device in the first network to receive a reference signal based on the configuration of the second network.

The method further includes wherein the configuration indicates at least one of a frequency tone of the reference signal, a reference signal sequence of the reference signal, or a cell identifier of the second network. The method further includes wherein the configuration indicates a numerology of the second network that is different from a numerology of the first network. The method further includes receiving, by the first wireless communication device from the third wireless communication device, a measurement based on at least the reference signal received by the third wireless communication device and the configuration of the second network. The method further includes wherein the configuration indicates at least a first frequency tone in a time period for a reference signal transmission by the second network, wherein the method further comprises transmitting, by the first wireless communication device to the third wireless communication device, a data signal during the time period, and wherein the data signal is transmitted on at least a second frequency tone different from the first frequency tone. The method further includes wherein the configuration indicates a time period for a reference signal transmission by the second network, and wherein the method further comprises transmitting, by the first wireless communication device to the third wireless communication device, a data signal during another time period. The method further includes wherein the second network is a long-term evolution (LTE) network. The method further includes wherein the second wireless communication device is a LTE base station (BS), and wherein the first wireless communication device and the second wireless communication device are co-located.

Embodiments of the present disclosure include an apparatus comprising a transceiver configured to receive, from a second wireless communication device, a configuration of a second network, wherein the apparatus and the second wireless communication device are associated with a first network, and wherein the first network and the second network are different; and receive, from a third wireless communication device based on the configuration of the second network, a reference signal, wherein the third wireless communication device is associated with the second network; and a processor configured to determine a measurement in the first network based on the reference signal of the second network.

The apparatus further includes wherein the configuration indicates at least one of a frequency tone of the reference signal, a reference signal sequence of the reference signal, or a cell identifier of the second network. The apparatus further includes wherein configuration indicates a numerology of the second network that is different from a numerology of the first network. The apparatus further includes wherein the transceiver is further configured to transmit, to the second wireless communication device, the determined measurement. The apparatus further includes wherein the processor is further configured to determine the measurement by determining a channel quality of a channel between the apparatus and the second wireless communication device based on the reference signal. The apparatus further includes wherein the processor is further configured to determine the measurement by determining a channel quality of a spatial layer between the apparatus and the second wireless communication device based on the reference signal. The apparatus further includes wherein the processor is further configured to perform error tracking based on the determined measurement, and wherein the error tracking includes at least one of a frequency offset tracking or a timing offset tracking. The apparatus further includes wherein the transceiver is further configured to receive, from the second wireless communication device, a data signal, and wherein the processor is further configured to demodulate the data signal based on the determined measurement. The apparatus further includes wherein the configuration indicates at least a first frequency tone and a time period for a reference signal transmission by the second network, and wherein the transceiver is further configured to receive the reference signal by receiving the reference signal on at least the first frequency tone during the time period; and receive the data signal by receiving the data signal from at least a second frequency tone during the time period, wherein the first frequency tone and the second frequency tone are different. The apparatus further includes wherein the configuration indicates a time period for a reference signal transmission by the second network, and wherein the transceiver is further configure to receive the reference signal by receiving the reference signal during the time period; and receive the data signal by receiving the data signal during another time period. The apparatus further includes wherein the second network is a long-term evolution (LTE) network. The apparatus further includes wherein the third wireless communication device is a LTE base station (BS), and wherein the second wireless communication device and the third wireless communication device are co-located.

Embodiments of the present disclosure include an apparatus comprising a processor configured to obtain, from a second wireless communication device, a configuration of a second network, wherein the apparatus is associated with a first network, wherein the second wireless communication device is associated with the second network, and wherein the first network and the second network are different; and a transceiver configured to transmit an instruction instructing a third wireless communication device in the first network to receive a reference signal based on the configuration of the second network.

The apparatus further includes wherein the configuration indicates at least one of a frequency tone of the reference signal, a reference signal sequence of the reference signal, or a cell identifier of the second network. The apparatus further includes wherein the configuration indicates a numerology of the second network that is different from a numerology of the first network. The apparatus further includes wherein the transceiver is further configured to receive, from the third wireless communication device, a measurement based on at least the reference signal received by the third wireless communication device and the configuration of the second network. The apparatus further includes wherein the configuration indicates at least a first frequency tone in a time period for a reference signal transmission by the second network, wherein the transceiver is further configured to transmit, to the third wireless communication device, a data signal during the time period, and wherein the data signal is transmitted on at least a second frequency tone different from the first frequency tone. The apparatus further includes wherein the configuration indicates a time period for a reference signal transmission by the second network, and wherein the transceiver is further configured to transmit, to the third wireless communication device, a data signal during another time period. The apparatus further includes wherein the second network is a long-term evolution (LTE) network. The apparatus further includes wherein the second wireless communication device is a LTE base station (BS), and wherein the apparatus and the second wireless communication device are co-located.

Embodiments of the present disclosure include a computer-readable medium having program code recorded thereon, the program code comprising code for causing a first wireless communication device to receive, from a second wireless communication device, a configuration of a second network, wherein the first wireless communication device and the second wireless communication device are associated with a first network, and wherein the first network and the second network are different; code for causing the first wireless communication device to receive, from a third wireless communication device based on the configuration of the second network, a reference signal, wherein the third wireless communication device is associated with the second network; and code for causing the first wireless communication device to determine a measurement in the first network based on the reference signal of the second network.

The computer-readable medium further includes wherein the configuration indicates at least one of a frequency tone of the reference signal, a reference signal sequence of the reference signal, or a cell identifier of the second network. The computer-readable medium further includes wherein the configuration indicates a numerology of the second network that is different from a numerology of the first network. The computer-readable medium further includes code for causing the first wireless communication device to transmit, to the second wireless communication device, the determined measurement. The computer-readable medium further includes wherein the code for causing the first wireless communication device to determine the measurement is further configured to determine a channel quality of a channel between the first wireless communication device and the second wireless communication device based on the reference signal. The computer-readable medium further includes wherein the code for causing the first wireless communication device to determine the measurement is further configured to determine a channel quality of a spatial layer between the first wireless communication device and the second wireless communication device based on the reference signal. The computer-readable medium further includes code for causing the first wireless communication device to perform error tracking based on the determined measurement, wherein the error tracking includes at least one of a frequency offset tracking or a timing offset tracking. The computer-readable medium further includes code for causing the first wireless communication device to receive, from the second wireless communication device a data signal; and code for causing the first wireless communication device to demodulate the data signal based on the determined measurement. The computer-readable medium further includes wherein the configuration indicates at least a first frequency tone and a time period for a reference signal transmission by the second network, wherein the code for causing the first wireless communication device to receive the reference signal is further configured to receive the reference signal on at least the first frequency tone during the time period, wherein the code for causing the first wireless communication device to receive the data signal is further configured to receive the data signal from at least a second frequency tone during the time period, and wherein the first frequency tone and the second frequency tone are different. The computer-readable medium further includes wherein the configuration indicates a time period for a reference signal transmission by the second network, wherein the code for causing the first wireless communication device to receive the reference signal is further configured to receive the reference signal during the time period, and wherein the code for causing the first wireless communication device to receive the data signal is further configured to receive the data signal during another time period. The computer-readable medium further includes wherein the second network is a long-term evolution (LTE) network. The computer-readable medium further includes wherein the third wireless communication device is a LTE base station (BS), and wherein the second wireless communication device and the third wireless communication device are co-located.

Embodiments of the present disclosure include a computer-readable medium having program code recorded thereon, the program code comprising code for causing a first wireless communication device to obtain, from a second wireless communication device, a configuration of a second network, wherein the first wireless communication device is associated with a first network, wherein the second wireless communication device is associated with the second network, and wherein the first network and the second network are different; and code for causing the first wireless communication device to transmit an instruction instructing a third wireless communication device in the first network to receive a reference signal based on the configuration of the second network.

The computer-readable medium further includes wherein the configuration indicates at least one of a frequency tone of the reference signal, a reference signal sequence of the reference signal, or a cell identifier of the second network. The computer-readable medium further includes wherein the configuration indicates a numerology of the second network that is different from a numerology of the first network. The computer-readable medium further includes code for causing the first wireless communication device to receive, from the third wireless communication device, a measurement based on at least the reference signal received by the third wireless communication device and the configuration of the second network. The computer-readable medium further includes wherein the configuration indicates at least a first frequency tone in a time period for a reference signal transmission by the second network, wherein the computer-readable medium further comprises code for causing the first wireless communication device to transmit, to the third wireless communication device, a data signal during the time period, and wherein the data signal is transmitted on at least a second frequency tone different from the first frequency tone. The computer-readable medium further includes wherein the configuration indicates a time period for a reference signal transmission by the second network, and wherein the computer-readable medium further comprises code for causing the first wireless communication device to transmit, to the third wireless communication device, a data signal during another time period. The computer-readable medium further includes wherein the second network is a long-term evolution (LTE) network. The computer-readable medium further includes wherein the second wireless communication device is a LTE base station (BS), and wherein the first wireless communication device and the second wireless communication device are co-located.

Embodiments of the present disclosure include an apparatus comprising means for receiving, from a second wireless communication device, a configuration of a second network, wherein the apparatus and the second wireless communication device are associated with a first network, and wherein the first network and the second network are different; means for receiving, from a third wireless communication device based on the configuration of the second network, a reference signal, wherein the third wireless communication device is associated with the second network; and means for determining a measurement in the first network based on the reference signal of the second network.

The apparatus further includes wherein the configuration indicates at least one of a frequency tone of the reference signal, a reference signal sequence of the reference signal, or a cell identifier of the second network. The apparatus further includes wherein configuration indicates a numerology of the second network that is different from a numerology of the first network. The apparatus further includes means for transmitting, to the second wireless communication device, the determined measurement. The apparatus further includes wherein the means for determining the measurement is further configured to determine a channel quality of a channel between the apparatus and the second wireless communication device based on the reference signal. The apparatus further includes wherein the means for determining the measurement is further configured to determine a channel quality of a spatial layer between the apparatus and the second wireless communication device based on the reference signal. The apparatus further includes means for performing error tracking based on the determined measurement, wherein the error tracking includes at least one of a frequency offset tracking or a timing offset tracking. The apparatus further includes means for receiving, from the second wireless communication device, a data signal; and means for demodulating the data signal based on the determined measurement. The apparatus further includes wherein the configuration indicates at least a first frequency tone and a time period for a reference signal transmission by the second network, wherein the means for receiving the reference signal is further configured to receive the reference signal on at least the first frequency tone during the time period, wherein the means for receiving the data signal is further configured to receive the data signal from at least a second frequency tone during the time period, and wherein the first frequency tone and the second frequency tone are different. The apparatus further includes wherein the configuration indicates a time period for a reference signal transmission by the second network, wherein the means for receiving the reference signal is further configured to receive the reference signal during the time period, and wherein the means for receiving the data signal is further configured to receive the data signal during another time period. The apparatus further includes wherein the second network is a long-term evolution (LTE) network. The apparatus further includes wherein the third wireless communication device is a LTE base station (BS), and wherein the second wireless communication device and the third wireless communication device are co-located.

Embodiments of the present disclosure include an apparatus comprising means for obtaining, from a second wireless communication device, a configuration of a second network, wherein the apparatus is associated with a first network, wherein the second wireless communication device is associated with the second network, and wherein the first network and the second network are different; and means for transmitting an instruction instructing a third wireless communication device in the first network to receive a reference signal based on the configuration of the second network.

The apparatus further includes wherein the configuration indicates at least one of a frequency tone of the reference signal, a reference signal sequence of the reference signal, or a cell identifier of the second network. The apparatus further includes wherein the configuration indicates a numerology of the second network that is different from a numerology of the first network. The apparatus further includes means for receiving, from the third wireless communication device, a measurement based on at least the reference signal received by the third wireless communication device and the configuration of the second network. The apparatus further includes wherein the configuration indicates at least a first frequency tone in a time period for a reference signal transmission by the second network, wherein the apparatus further comprises means for transmitting, to the third wireless communication device, a data signal during the time period, and wherein the data signal is transmitted on at least a second frequency tone different from the first frequency tone. The apparatus further includes wherein the configuration indicates a time period for a reference signal transmission by the second network, and wherein the apparatus further comprises means for transmitting, to the third wireless communication device, a data signal during another time period. The apparatus further includes wherein the second network is a long-term evolution (LTE) network. The apparatus further includes wherein the second wireless communication device is a LTE base station (BS), and wherein the apparatus and the second wireless communication device are co-located.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a first wireless communication device from a second wireless communication device, a reference signal configuration of a first network of a long-term evolution (LTE) radio access technology (RAT), wherein the first wireless communication device and the second wireless communication device are associated with a second network of another RAT, wherein the reference signal configuration indicates at least a number of antenna ports associated with a reference signal of the first network;
   receiving, by the first wireless communication device from a third wireless communication device associated with the first network, the reference signal of the first network;
   receiving, by the first wireless communication device from the second wireless communication device, a communication signal including data of the second network based on the reference signal configuration of the first network;
   determining, by the first wireless communication device, a channel response estimate for a communication channel between the first wireless communication device and the second wireless communication device in the second network based on the reference signal of the first network and the number of antenna ports associated with the reference signal; and
   decoding, by the first wireless communication device, the data of the second network from the communication signal based on the determined channel estimate.

2. The method of claim 1, wherein the reference signal configuration indicates at least one of a frequency tone of the reference signal of the first network or a time period of the reference signal of the first network.

3. The method of claim 2, wherein the reference signal configuration indicates the frequency tone of the reference signal of the first network, and wherein the receiving the communication signal is further based on a mapping of data tones to frequency tones that are non-overlapping with the frequency tone of the reference signal of the first network.

4. The method of claim 1, wherein the reference signal configuration indicates at least one of sequence information for the reference signal of the first network or a cell identifier of the first network.

5. The method of claim 1, wherein the reference signal configuration indicates a numerology of the first network that is different from a numerology of the second network.

6. The method of claim 1, further comprising:
   determining, by the first wireless communication device, a measurement of the second network based on the reference signal of the first network; and
   transmitting, by the first wireless communication device to the second wireless communication device, the determined measurement.

7. The method of claim 1, wherein the receiving the reference signal configuration includes:
   receiving, by the first wireless communication device from the second wireless communication device, at least one of a radio resource control (RRC) message including the reference signal configuration, a media access control (MAC) control element (CE) including the reference signal configuration, or downlink control information (DCI) including the reference signal configuration.

8. The method of claim 1, further comprising:
   performing, by the first wireless communication device, at least one of:
   a timing-offset tracking based on the reference signal to correct a timing error between the first wireless communication device and the second wireless communication device; or
   a frequency-offset tracking based on the reference signal to correct a carrier frequency error between the first wireless communication device and the second wireless communication device.

9. A method of wireless communication, comprising:
   obtaining, by a first wireless communication device from a second wireless communication device, a reference signal configuration of a first network of a long-term evolution (LTE) radio access technology (RAT), wherein the second wireless communication device is associated with the first network, wherein the first wireless communication device is associated with a second network of another RAT, and wherein the reference signal configuration indicates at least a number of antenna ports associated with a reference signal of the first network;
   transmitting, by the first wireless communication device to a third wireless communication device in the second network, the reference signal configuration indicating at least the number of antenna ports associated with the reference signal of the first network; and
   transmitting, by the first wireless communication device to the third wireless communication device, a communication signal including data of the second network based on at least the number of antenna ports associated with the reference signal of the first network.

10. The method of claim 9, wherein the reference signal configuration indicates at least one of a frequency tone of the reference signal of the first network or a time period of the reference signal of the first network.

11. The method of claim 10, wherein the reference signal configuration indicates the frequency tone of the reference signal of the first network, and wherein the transmitting the communication signal is further based on a mapping of data tones to frequency tones that are non-overlapping with the frequency tone of the reference signal of the first network.

12. The method of claim 9, wherein the reference signal configuration indicates at least one of sequence information for the reference signal of the first network or a cell identifier of the first network.

13. The method of claim 9, wherein the reference signal configuration indicates a numerology of the second network that is different from a numerology of the first network.

14. The method of claim 9, further comprising:
   receiving, by the first wireless communication device from the third wireless communication device, a measurement based on at least the reference signal received by the third wireless communication device and the reference signal configuration of the first network.

15. The method of claim 9, wherein the transmitting the reference signal configuration includes:
transmitting, by the first wireless communication device to the second wireless communication device, at least one a radio resource control (RRC) message including the reference signal configuration, a media access control (MAC) control element (CE) including the reference signal configuration, or downlink control information (DCI) including the reference signal configuration.

16. An apparatus comprising:
a transceiver configured to:
receive, from a second wireless communication device, a reference signal configuration of a first network of a long-term evolution (LTE) radio access technology (RAT), wherein the apparatus and the second wireless communication device are associated with a second network of another RAT, wherein the reference signal configuration indicates at least a number of antenna ports associated with a reference signal of the first network;
receive, from a third wireless communication device associated with the first network, the reference signal of the first network; and
receive, from the second wireless communication device, a communication signal including data of the second network based on the reference signal configuration of the first network; and
a processor configured to:
determine a channel response estimate for a communication channel between the apparatus and the second wireless communication device in the second network based on the reference signal of the first network and the number of antenna ports associated with the reference signal; and
decode the data of the second network from the communication signal based on the determined channel estimate.

17. The apparatus of claim 16, wherein the reference signal configuration indicates at least one of a frequency tone of the reference signal of the first network or a time period of the reference signal of the first network.

18. The apparatus of claim 17, wherein the reference signal configuration indicates the frequency tone of the reference signal of the first network, and wherein the transceiver is further configured to receive the communication signal based on a mapping of data tones to frequency tones that are non-overlapping with the frequency tone of the reference signal of the first network.

19. The apparatus of claim 16, wherein the reference signal configuration indicates at least one of sequence information for the reference signal of the first network or a cell identifier of the first network.

20. The apparatus of claim 16, wherein the reference signal configuration indicates a numerology of the first network that is different from a numerology of the second network.

21. The apparatus of claim 16,
wherein the processor is further configured to determine a measurement of the second network based on the reference signal of the first network, and
wherein the transceiver is further configured to transmit, to the second wireless communication device, the determined measurement.

22. The apparatus of claim 16, wherein the third wireless communication device is a LTE base station (BS), and wherein the second wireless communication device and the third wireless communication device are co-located.

23. The apparatus of claim 16, wherein the processor is further configured to:
perform at least one of:
a timing-offset tracking based on the reference signal to correct a timing error between the apparatus and the second wireless communication device; or
a frequency-offset tracking based on the reference signal to correct a carrier frequency error between the apparatus and the second wireless communication device.

24. An apparatus comprising:
a processor configured to obtain, from a second wireless communication device, a reference signal configuration of a first network of a long-term evolution (LTE) radio access technology (RAT), wherein the second wireless communication device is associated with the first network, wherein the apparatus is associated with a second network of another RAT and wherein the reference signal configuration indicates at least a number of antenna ports associated with a reference signal of the first network; and
a transceiver configured to:
transmit, to a third wireless communication device in the second network, the reference signal configuration indicating at least the number of antenna ports associated with the reference signal of the first network; and
transmit, to the third wireless communication device, a communication signal including data of the second network based on at least the number of antenna ports associated with the reference signal configuration of the first network.

25. The apparatus of claim 24, wherein the reference signal configuration indicates at least one of a frequency tone of the reference signal of the first network or a time period of the reference signal of the first network.

26. The apparatus of claim 25, wherein the reference signal configuration indicates the frequency tone of the reference signal of the first network, and wherein the transceiver is further configured to transmit the communication signal further based on a mapping of data tones to frequency tones that are non-overlapping with the frequency tone of the reference signal of the first network.

27. The apparatus of claim 24, wherein the reference signal configuration indicates at least one of sequence information for the reference signal of the first network or a cell identifier of the first network.

28. The apparatus of claim 24, wherein the reference signal configuration indicates a numerology of the second network that is different from a numerology of the first network.

29. The apparatus of claim 24, wherein the transceiver is further configured to receive, from the third wireless communication device, a measurement based on at least the reference signal received by the third wireless communication device and the reference signal configuration of the first network.

30. The apparatus of claim 24, wherein the second wireless communication device is a LTE base station (BS), and wherein the apparatus and the second wireless communication device are co-located.

* * * * *